United States Patent
Takahashi et al.

(10) Patent No.: US 11,385,082 B2
(45) Date of Patent: Jul. 12, 2022

(54) ENVIRONMENTAL CHARACTERISTIC MEASUREMENT DEVICE AND ENVIRONMENTAL CHARACTERISTIC MEASUREMENT METHOD

(71) Applicant: Nippon Telegraph and Telephone Corporation, Tokyo (JP)

(72) Inventors: Hiroshi Takahashi, Musashino (JP); Kunihiro Toge, Musashino (JP); Tomokazu Oda, Musashino (JP); Tetsuya Manabe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/042,638

(22) PCT Filed: Mar. 26, 2019

(86) PCT No.: PCT/JP2019/012709
§ 371 (c)(1),
(2) Date: Sep. 28, 2020

(87) PCT Pub. No.: WO2019/194020
PCT Pub. Date: Oct. 10, 2019

(65) Prior Publication Data
US 2021/0018343 A1 Jan. 21, 2021

(30) Foreign Application Priority Data
Apr. 4, 2018 (JP) .............................. JP2018-072693

(51) Int. Cl.
*G01D 5/353* (2006.01)

(52) U.S. Cl.
CPC ......... *G01D 5/353* (2013.01); *G01D 5/35364* (2013.01)

(58) Field of Classification Search
CPC ........................... G01D 5/353; G01D 5/35364
See application file for complete search history.

(56) References Cited

U.S. PATENT DOCUMENTS

| 2008/0068586 A1* | 3/2008 | Kishida | ................... | G01L 1/242 356/32 |
| 2011/0228255 A1* | 9/2011 | Li | ......................... | G01K 11/32 356/33 |

(Continued)

OTHER PUBLICATIONS

International Search Report dated Jun. 18, 2019, issued in PCT Application No. PCT/JP2019/012709, filed Mar. 26, 2019.

(Continued)

*Primary Examiner* — Dominic J Bologna
(74) *Attorney, Agent, or Firm* — Workman Nydegger

(57) ABSTRACT

An environmental property measurement apparatus includes a unit configured to receive probe light in a desired mode from one end of a measurement optical fiber, a unit configured to receive, from the other end of the measurement optical fiber, a light pulse in the desired mode as a pump light pulse with respect to the probe light, the light pulse having a frequency difference corresponding to a Brillouin frequency shift of the measurement optical fiber relative to the probe light on a high frequency side, and a unit configured to receive second probe light having the frequency difference corresponding to the Brillouin frequency shift of the measurement optical fiber relative to the probe light on a low frequency side from the other end of the measurement optical fiber, the second probe light being probe light with respect to the probe light in another mode different from the desired mode.

5 Claims, 5 Drawing Sheets

(56) References Cited

U.S. PATENT DOCUMENTS

| | | | |
|---|---|---|---|
| 2013/0216176 A1* | 8/2013 | Li | G01L 1/246 |
| | | | 385/12 |
| 2014/0083197 A1* | 3/2014 | Zadok | G01N 21/88 |
| | | | 73/800 |
| 2016/0109222 A1* | 4/2016 | Wang | G01B 11/168 |
| | | | 356/34 |
| 2019/0101419 A1* | 4/2019 | Rowen | H01S 3/302 |

OTHER PUBLICATIONS

Y. Weng, et al., *Single-end Simultaneous Temperature and Strain Sensing Techniques Based on Brillouin Optical Time Domain Reflectometry in Few-mode Fibers*, Optics Express, vol. 23, No. 7, pp. 9024-9039 (2015).

X. Zhou, et al., *Dual-parameter Measurement Based on Multiple Acoustic Modes in SBS Process*, Asia Pacific Optical Sensors Conference 2016, paper Th4A.47 (2016).

\* cited by examiner

ENVIRONMENTAL CHARACTERISTIC MEASUREMENT DEVICE AND ENVIRONMENTAL CHARACTERISTIC MEASUREMENT METHOD

TECHNICAL FIELD

The present invention relates to an environmental property measurement apparatus and an environmental property measurement method, and particularly, to an environmental property measurement apparatus and an environmental property measurement method for non-destructively evaluating environmental properties along an optical fiber in a few mode fiber (hereinafter also referred to as an "FMF") or an optical fiber distribution sensing system using the same.

BACKGROUND ART

A Brillouin light sensing technology is a technology for measuring a Brillouin frequency shift (BFS) change to monitor a change in temperature or strain along a sensing optical fiber. The measurement of the BFS allows application to health monitoring of a target structure to be measured. For example, temperature and strain sensing of large structures, airplanes, or the like is performed.

However, when there are both a change in temperature and a change in strain in the sensing optical fiber, it is difficult to measure the amount of the change in temperature and the amount of the change in strain because the BFS is sensitive to both the temperature and the strain. Therefore, a method of applying a few mode fiber (FMF) as a sensing optical fiber and separately measuring the amount of a change in temperature and the amount of a change in strain from a difference between the amounts of change in a plurality of Brillouin gain spectral peaks that have been generated in a higher order mode of light in NPL 1 and a higher order acoustic mode in NPL 2 has been proposed.

On the other hand, when a few mode fiber is strained or when modes of light are converted and coupled due to connection points or bending in installation in an actual environment, Brillouin gain spectra in respective output modes overlap, which makes it impossible to accurately measure a plurality of Brillouin gains generated in the mode of light and the mode of acoustic waves.

CITATION LIST

Non Patent Literature

NPL 1: Y. Weng, et al., Opt. Express., 23, No. 7, pp. 9024-9039 (2015)
NPL 2: X. Zhou, et al., proc. of APOS 2016, Th4A.47 (2016).

SUMMARY OF THE INVENTION

Technical Problem

The present invention has been made in view of the above circumstances, and an object of the present invention is to provide an environmental property measurement apparatus and an environmental property measurement method using a few mode fiber through which a Brillouin gain is accurately measured in a Brillouin optical sensing technology using a Brillouin gain in a mode of light and a mode of acoustic waves even in sensing of an optical fiber in which mode conversion and mode coupling have occurred.

Means for Solving the Problem

In order to solve the above problem, an invention described in an embodiment is an environmental property measurement apparatus for measuring an environmental property in a length direction using a few mode fiber having a plurality of multiplexed modes as a measurement optical fiber by analyzing a Brillouin frequency shift using a Brillouin optical time domain analysis method, the environmental property measurement apparatus including: a unit configured to receive probe light in a desired mode from a distal end of the measurement optical fiber; a unit configured to receive, from a proximal end of the measurement optical fiber, a light pulse in the desired mode as a pump light pulse with respect to the probe light, the light pulse having a frequency difference corresponding to a Brillouin frequency shift of the measurement optical fiber relative to the probe light on a high frequency side; and a unit configured to receive second probe light having the frequency difference corresponding to the Brillouin frequency shift of the measurement optical fiber relative to the probe light on a low frequency side from a proximal end of the measurement optical fiber, the second probe light being probe light with respect to the probe light in another mode different from the desired mode.

An invention described in another embodiment is an environmental property measurement method for measuring an environmental property in a length direction using a few mode fiber having a plurality of multiplexed modes as a measurement optical fiber by analyzing a Brillouin frequency shift using a Brillouin optical time domain analysis method, the environmental property measurement method including: receiving probe light in a desired mode from a distal end of the measurement optical fiber; receiving, from a proximal end of the measurement optical fiber, a light pulse in the desired mode as a pump light pulse with respect to the probe light, the light pulse having a frequency difference corresponding to a Brillouin frequency shift of the measurement optical fiber relative to the probe light on a high frequency side; and receiving second probe light having the frequency difference corresponding to the Brillouin frequency shift of the measurement optical fiber relative to the probe light on a low frequency side from a proximal end of the measurement optical fiber, the second probe light being probe light with respect to the probe light in another mode different from the desired mode.

BRIEF DESCRIPTION OF DRAWINGS

FIG. 7A illustrates a Brillouin gain according to the pump light pulse and the probe light, FIG. 7B illustrates a relationship between the Brillouin gain in FIG. 7A and a Brillouin gain according to the probe light and the secondary probe light, and FIG. 7C illustrates a combination of two types of Brillouin gains in FIG. 7B.

DESCRIPTION OF EMBODIMENTS

Hereinafter, an embodiment of the present invention will be described in detail with reference to the drawings.

In an environmental property measurement apparatus that measures environmental properties in a length direction using a few mode fiber having a plurality of multiplexed modes as a measurement optical fiber by analyzing a Brillouin frequency shift using Brillouin optical time domain analysis method (BOTDA), it is possible to accurately measure a Brillouin gain using a Brillouin gain caused by secondary Brillouin acoustic waves caused by probe light and secondary probe light even in sensing of an optical fiber in which mode conversion and mode coupling have occurred, by curbing a Brillouin gain caused by another mode different from a desired mode. Examples of the environmental properties include a temperature and a strain that are measured in a length direction of an optical fiber, as in NPL 1 and 2.

An environmental property measurement apparatus of the embodiment is also an environmental property measurement apparatus for performing analysis using Brillouin optical time domain analysis (BOTDA) and includes a unit configured to receive probe light in a desired mode from a distal end of a measurement optical fiber, a unit configured to receive, from a proximal end of the measurement optical fiber, a light pulse in the desired mode as a pump light pulse with respect to the probe light, the light pulse having a frequency difference corresponding to a Brillouin frequency shift of the measurement optical fiber relative to the probe light on a high frequency side, and a unit configured to receive second probe light having the frequency difference corresponding to the Brillouin frequency shift in another mode different from a desired mode with respect to the probe light from a proximal end of the measurement optical fiber, the second probe light being probe light with respect to the probe light in the other mode.

According to the environmental property measurement apparatus of the embodiment, it is possible to accurately ascertain a Brillouin gain spectrum in a Brillouin optical sensing using a few mode fiber even when Brillouin gain spectra overlap due to an influence of mode conversion or mode coupling.

Figure 1:
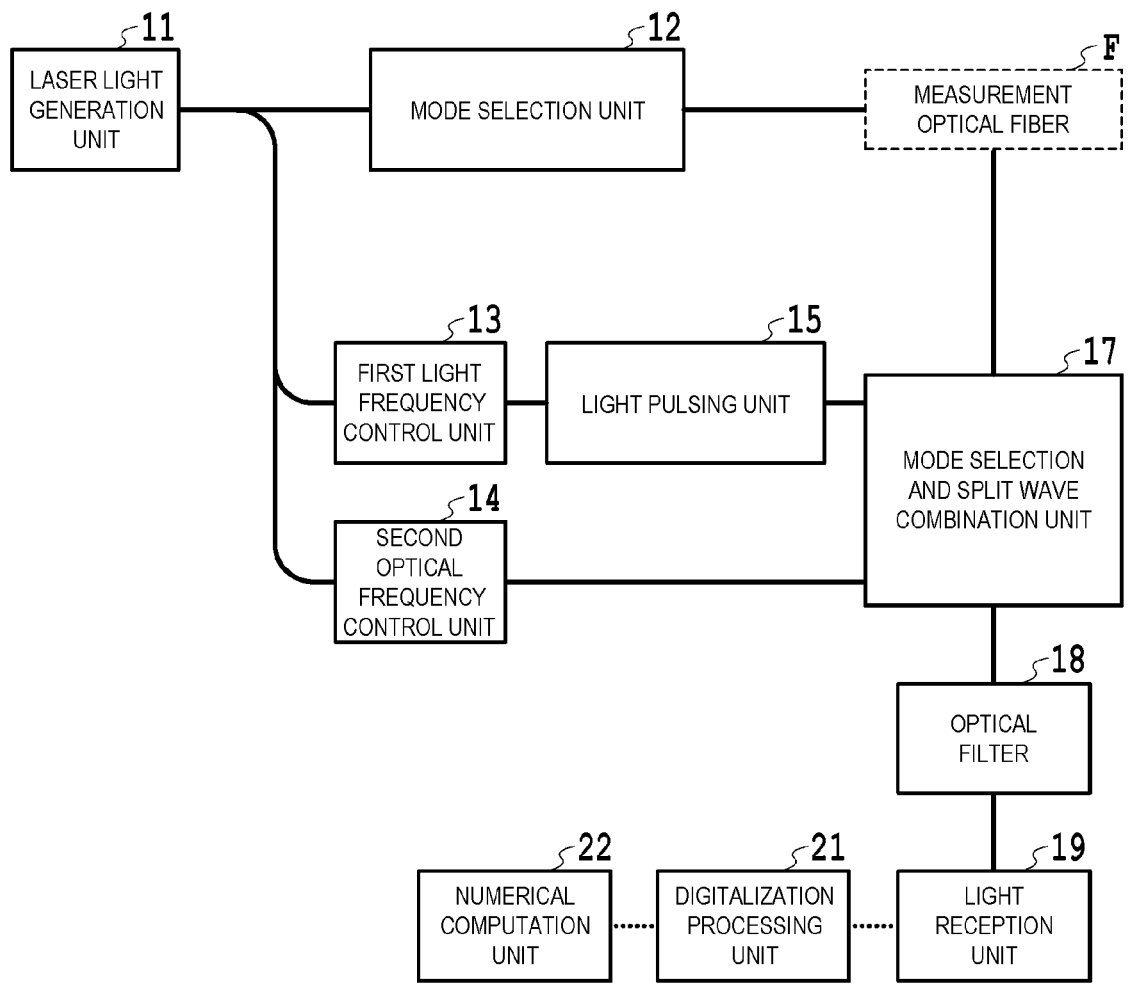
FIG. 1 is a block configuration diagram illustrating an environmental property measurement apparatus according to an embodiment.

FIG. 1 is a block configuration diagram illustrating an example of an environmental property measurement apparatus according to the embodiment. The environmental property measurement apparatus illustrated in FIG. 1 can evaluate the Brillouin gain spectrum in a distributive and non-destructive manner in an optical fiber that is a measurement target connected to a light output end. In the environmental property measurement apparatus of the embodiment, a laser light generation unit 11 has three branch outputs that are connected to each of a mode selection unit 12, a first light frequency control unit 13, and a second light frequency control unit 14 as illustrated in FIG. 1. The mode selection unit 12 is connected to a distal end of a measurement optical fiber F. The first light frequency control unit 13 is connected to a mode selection and combination unit 17 via a first light pulsing unit 15, and the second light frequency control unit 14 is connected directly to the mode selection and wave combination unit 17. The mode selection and wave combination unit 17 is further connected to a proximal end of the optical fiber F and to an optical filter 18. The optical filter 18 is further connected to a light reception unit 19, and a digitalization processing unit 21 and a numerical computation unit 22, which form a measurement system, are sequentially connected to the light reception unit 19.

In the environmental property measurement apparatus of the embodiment, the light output from the laser light generation unit 11 that generates coherent light is split into three light outputs, first branch light among the light outputs is input to the mode selection unit 12, a desired mode is selected, and the first light is used as probe light input to the distal end of the measurement optical fiber F.

In the second branch light, a frequency difference of about 10 to 11 GHz corresponding to the Brillouin frequency shift of the measurement optical fiber F is imparted to the high frequency side by the first light frequency control unit 13, and then the second branch light is pulsed by the light pulsing unit 15 and is used as a pump light pulse causing Brillouin amplification with respect to the probe light.

In the third branch light, a frequency difference of about 10 to 11 GHz corresponding to the Brillouin frequency shift of the measurement optical fiber is imparted to the low frequency side by the second light frequency control unit 14, and then the third branch light is used as secondary probe light causing a Brillouin loss with respect to the probe light.

In the environmental property measurement apparatus of the embodiment, an absolute value of a frequency difference generated between the pump light pulse and the probe light and an absolute value of a frequency difference generated between the probe light and the secondary probe light are set to be equal to each other. In this case, configurations of the first light frequency control unit 13 and the second light frequency control unit 14 illustrated in FIG. 1 can be substituted with a configuration illustrated in FIG. 2 or a configuration illustrated in FIG. 3. The configuration in FIG. 2 and the configuration in FIG. 3 will be described herein.

Figure 2:
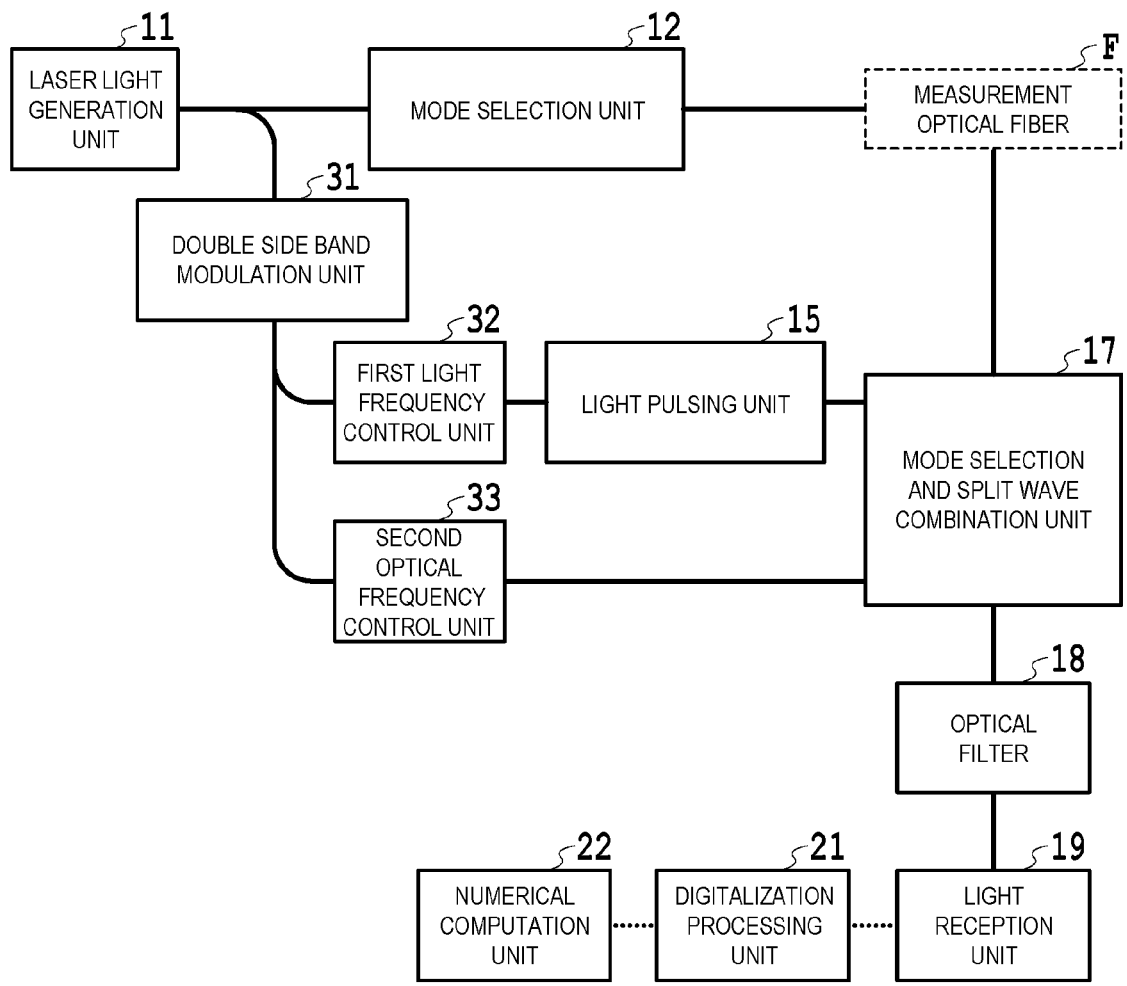
FIG. 2 is a block configuration diagram illustrating a modification example of the environmental property measurement apparatus according to the embodiment.

In the configuration of FIG. 2, one double side band modulation unit 31, a first optical filter unit 32, and a second optical filter unit 33 can be used instead of the first light frequency control unit 13 and the second light frequency control unit 14. For example, a high frequency side among two side bands obtained by performing sine wave modulation on an intensity modulator can be selected as the pump light pulse and a low frequency side can be selected as the secondary probe light by the first optical filter unit 32 and the second optical filter unit 33. In this case, there is one sine wave modulator that drives the modulator, and a apparatus configuration can be simplified.

Figure 3:
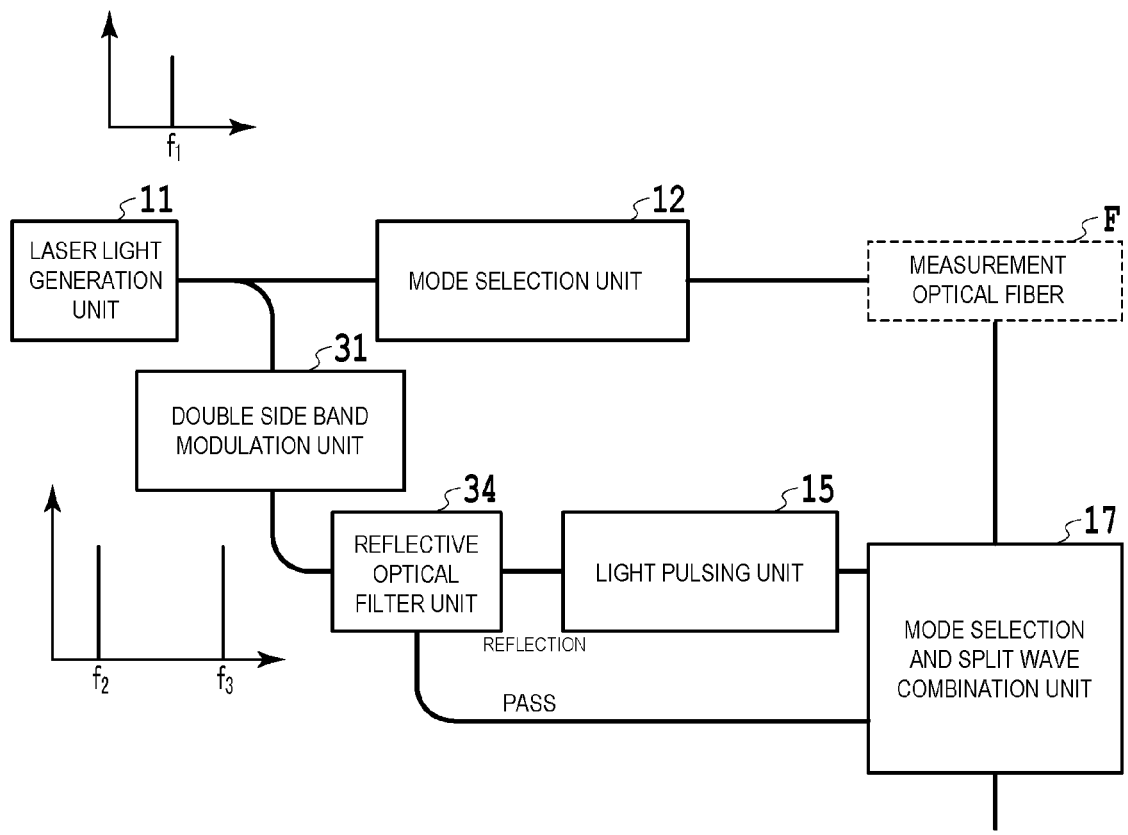
FIG. 3 is a block configuration diagram illustrating another modification example of the environmental property measurement apparatus according to the embodiment.
Figure 3:
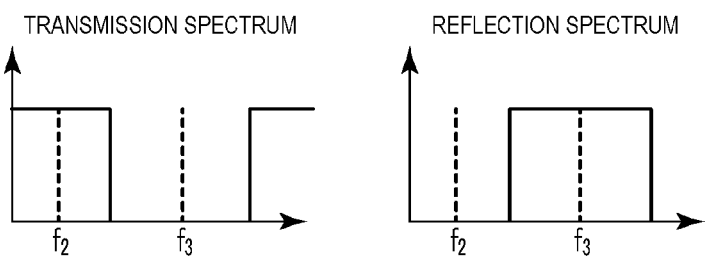

In the configuration illustrated in FIG. 3, one double side band modulation unit 31 and a reflective optical filter unit 34 can be used instead of the first light frequency control unit 13 and the second light frequency control unit 14. In this case, light on a high frequency side is selected as a reflection spectrum of the reflective optical filter unit 34, and light on a low frequency side is selected as a transmission spectrum of the reflective optical filter unit 34. Here, the selection of a high frequency side and a low frequency side of the transmission spectrum and the reflection spectrum of the reflective optical filter unit 34 may be reversed. In this case, the transmission spectrum may be connected to the first light pulsing unit 15 and the reflection spectrum may be connected to the mode selection and wave combination unit 17.

Referring back to FIG. 1, the pump light pulse and the secondary probe light are input to the proximal end of the measurement optical fiber F in any mode selected by the mode selection and split wave combination unit 17 in FIG. 1. The probe light is input to the distal end of the measurement optical fiber F in any mode selected by the mode selection wave combination unit 12 of FIG. 1.

The probe light interacts with the pump light pulses at any position on the measurement optical fiber F and is subjected to Brillouin amplification, any mode is selected by the mode selection and split wave combination unit 17 in FIG. 1 again, Rayleigh scattering of the pump light pulse and the secondary probe light is removed by the optical filter unit 18, and then the light is converted to an electrical signal by the light reception unit 19. After the electrical signal received by the light reception unit 19 is appropriately amplified, the electrical signal is digitalized by the digitalization processing unit 21, and an averaging process is performed on a difference between the pump light pulse and probe light intensity that does not interact using the numerical computation unit 22, thereby computing the Brillouin gain.

With the units (13, 14, 31, 32, 33, and 34) that control the light frequency in FIGS. 1 to 3, the frequency difference between the probe light and the pump light pulse can be appropriately changed, the Brillouin gain can be computed, and the Brillouin gain (Brillouin gain spectrum) at each frequency can be acquired.

Further, the frequency difference between the probe light and the secondary probe light is appropriately changed and the same Brillouin gain distribution as that between the probe light and the pump light pulse is obtained. Therefore, even when induced Brillouin scattering spectra in the respective modes of the measurement optical fiber F overlap, it is possible to remove the Brillouin spectrum in a mode other than a measurement target mode and acquire a desired Brillouin gain spectrum at any position of the measurement optical fiber.

The configuration of the environmental property measurement apparatus of the embodiment illustrated in FIG. 1 is an example, and any apparatus may be used as long as the apparatus can provide a light frequency difference corresponding to the Brillouin frequency shift between the pump light pulse and the probe light and between the probe light and the secondary probe light, select any mode for excitation, and extract a signal with Brillouin gain intensity in a time domain.

Next, principles of a measurement method in the environmental property measurement apparatus of the embodiment will be described in further detail.

Incidentally, considering an induced Brillouin scattering phenomenon in the FMF, the Brillouin frequency shift $v_b$ in any mode is given as Formula (1) below.

Formula 1

$$v_b = \frac{2n_i V_a}{\lambda} \quad \text{Formula (1)}$$

In Formula (1), $n_i$ is an effective refractive index of the mode, $V_a$ is an effective velocity of acoustic waves, and is a wavelength in vacuum.

Formula (1) indicates that the Brillouin frequency shift is different according to a mode of propagation in the FMF, and Brillouin spectrum information at any position in each obtained mode has a peak with respect to a different frequency in each mode. The environmental property measurement apparatus of the embodiment can be said to use the fact that the Brillouin spectrum information has a peak with respect to a different frequency in each mode.

Considering an FMF in which propagation occurs in two modes for simplicity, when the pump light pulse and the probe light have an amplitude in both an LP01 mode and an LP11 mode, the pump light pulse and the probe light have three spectral peaks:

$v_{01\text{-}01}$ (interaction between a pump component and a probe component in LP01)

$v_{01\text{-}11}$ (interaction between a pump component in LP01 and a probe component in LP11 and between a pump component in LP11 and a probe component in LP01)

$v_{11\text{-}11}$ (interaction between a pump component and a probe component in LP11).

Figure 4:
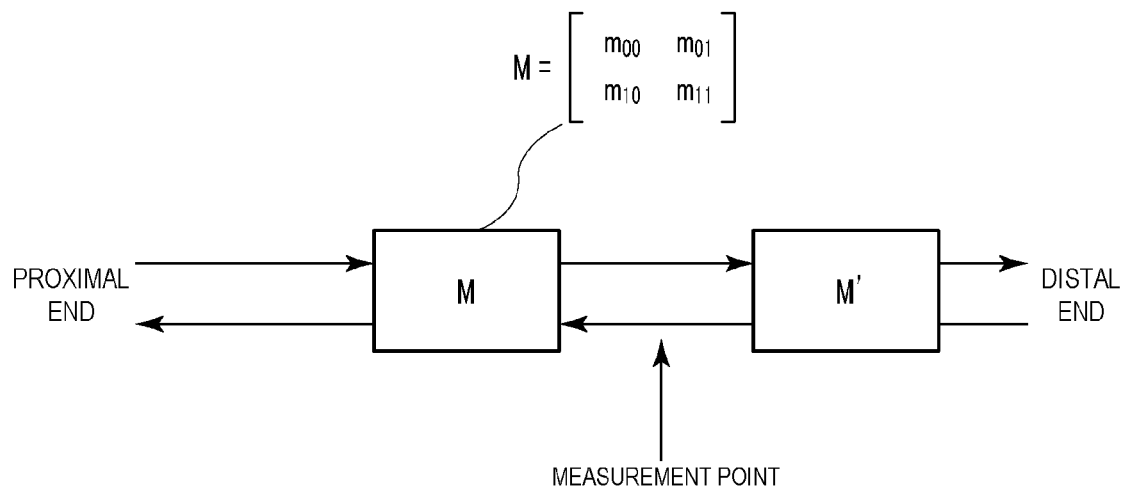
FIG. 4 is a diagram illustrating an example of an optical fiber transmission line model considered in an environmental property measurement method of the embodiment.

FIG. 4 is a diagram illustrating an example of an optical fiber transmission line model considered in the environmental property measurement method of the embodiment. For description of the measurement method in the environmental property measurement apparatus of the embodiment, the optical fiber transmission line model as illustrated in FIG. 4 is taken into account. It is assumed that a total length of a transmission line is L, a position of a mode conversion point is z, and a mode conversion point at which a coupling matrix is M is included in the middle of the transmission line. Now, for simplicity, considering a case in which the pump light pulse and the probe light in LP01 are incident on the measurement optical fiber, powers $b_0$ and $b_1$ of the probe light at the position of the measurement point are subjected to mode conversion by the coupling matrix M(L−z) and are shown in Formula (2) below when powers of the pump light pulse in LP01 and LP11 mode at a position of a measurement point are $a_0$ and $a_1$ and power of the incident probe light is Pr.

Formula 2

$$b_0 = m_{00}(L-z)P_r$$

$$b_1 = m_{10}(L-z)P_r \quad \text{Formula (2)}$$

Here, $m_{ij}(L-z)$ is an element of a coupling matrix M(L−z). The probe light subjected to Brillouin amplification by the pump light pulse at the measurement point is further subjected to mode conversion by a coupling matrix M(z) and arrives at the proximal end in the LP01 and LP11 modes. Considering an interaction between $a_0$ and $b_0$, a probe light intensity observed at the proximal end in the LP01 mode is as shown in Formula (3) using Formula (2) when a loss at points other than the mode conversion point is neglected.

Formula 3

$$m_{00}(z)g_{01\text{-}01}(v)a_0 b_0 = m_{00}(z)g_{01\text{-}01}(v)a_0 m_{00}(L-z)P_r \quad \text{Formula (3)}$$

Here, $g_{01\text{-}01}(v)$ is a gain profile with a peak at $v_{01\text{-}01}$, and $m_{ij}(z)$ is an element of the coupling matrix M(z). Similarly, a probe light intensity observed at the proximal end in the LP11 mode is shown in Formula (4):

Formula 4

$$m_{10}(z)g_{01\text{-}01}(v)a_0b_0=m_{10}(z)g_{01\text{-}01}(v)a_0m_{00}(L-z)P_r \quad \text{Formula (4)}$$

Thus, a sum of the Brillouin gain at the measurement point is shown in Formula (5) from Formulas (3) and (4).

Formula 5

$$\{m_{00}(z)+m_{10}(z)\}g_{01\text{-}01}(v)a_0m_{00}(L-z)P_r \quad \text{Formula (5)}$$

Similarly, considering an interaction between $a_0$ and $b_1$, a probe light intensity observed in the LP01 mode at the proximal end is shown in Formula (6)

Formula 6

$$m_{01}(z)g_{01\text{-}11}(v)a_0b_1=m_{01}(z)g_{01\text{-}11}(v)a_0m_{10}(L-z)P_r \quad \text{Formula (6)}$$

The probe light intensity observed at the proximal end in the LP11 mode is shown in Formula (7).

Formula 7

$$m_{11}(z)g_{01\text{-}11}(v)a_0b_1=m_{11}(z)g_{01\text{-}11})v)a_0m_{10}(L-z)P_r \quad \text{Formula (7)}$$

Thus, a sum of the Brillouin gain at the measurement point is shown in Formula (8) from Formulas (6) and (7).

Formula 8

$$\{m_{01}(z)+m_{11}(z)\}g_{01\text{-}11}(v)a_0m_{10}(L-z)P_r \quad \text{Formula (8)}$$

Similarly, considering an interaction between $a_1$ and $b_0$, the probe light intensity observed in the LP01 mode at the proximal end is shown in Formula (9)

Formula 9

$$m_{00}(z)g_{11\text{-}01}(v)a_1b_0=m_{00}(z)g_{11\text{-}01}(v)a_1m_{00}(L-z)P_r \quad \text{Formula (9)}$$

The probe light intensity observed at the proximal end in the LP11 mode is shown in Formula (10)

Formula 10

$$m_{10}(z)g_{11\text{-}01}(v)a_1b_0=m_{10}(z)g_{11\text{-}01}(v)a_1m_{00}(L-z)P_r \quad \text{Formula (10)}$$

Thus, a sum of the Brillouin gain at the measurement point is shown in Formula (11) from Formulas (9) and (10).

Formula 11

$$\{m_{00}(z)+m_{10}(z)\}g_{11\text{-}01}(v)a_1m_{00}(L-z)P_r \quad \text{Formula (11)}$$

Similarly, considering an interaction between $a_1$ and $b_1$, the probe light intensity observed in the LP01 mode at the proximal end is shown in Formula (12).

Formula 12

$$m_{01}(z)g_{11\text{-}11}(v)a_1b_1=m_{01}(z)g_{11\text{-}11}(v)a_1m_{10}(L-z)P_r \quad \text{Formula (12)}$$

The probe light intensity observed at the proximal end in the LP11 mode is shown in Formula (13).

Formula 13

$$m_{11}(z)g_{11\text{-}11}(v)a_1b_1=m_{11}(z)g_{11\text{-}11}(v)a_1m_{10}(L-z)P_r \quad \text{Formula (13)}$$

Thus, a sum of the Brillouin gain at the measurement point is shown in Formula (14) from Formulas (12) and (13).

Formula 14

$$\{m_{01}(z)+m_{11}(z)\}g_{11\text{-}11}(v)a_1m_{10}(L-z)P_r \quad \text{Formula (14)}$$

Figure 5:
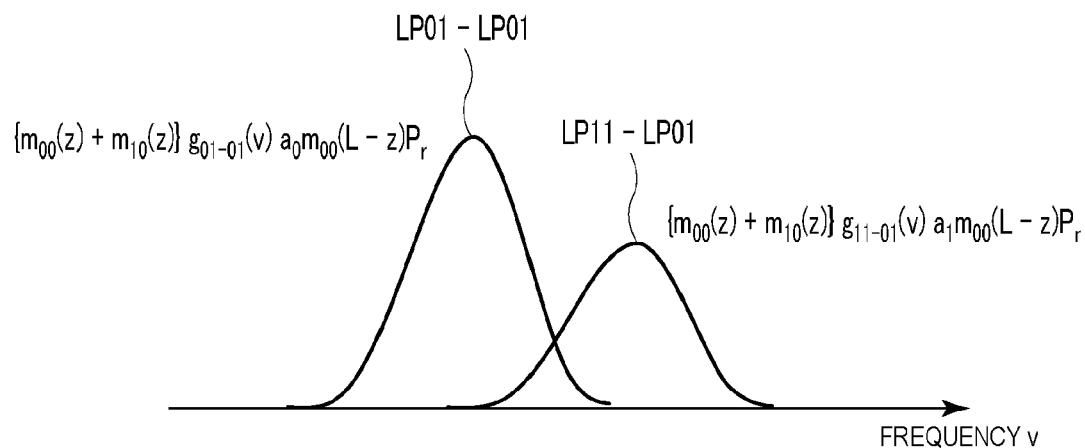
FIG. 5 illustrates an observation example of a Brillouin gain spectrum according to an amplitude as in an LP01 mode of a pump light pulse at a measurement point according to the environmental property measurement method of the embodiment.

Thus, the Brillouin gain spectrum when the LP01 mode of the probe light has been received at the measurement point is shown in Formula (5) and Formula (11), and is as illustrated in FIG. 5. Further, the Brillouin gain spectrum when the LP11 mode of the probe light at the measurement point is received is shown in Formula (8) and Formula (14), and is as illustrated in FIG. 6.

Figure 6:
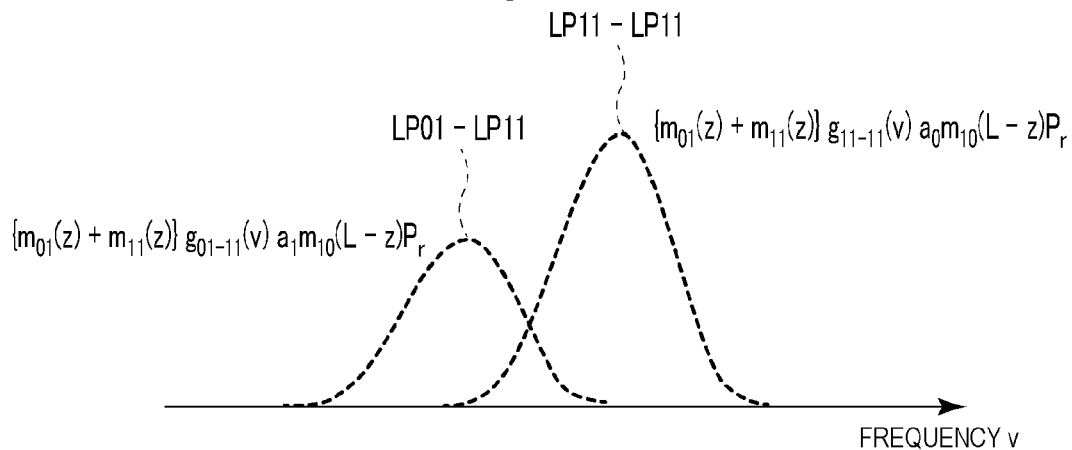
FIG. 6 illustrates an observation example of a Brillouin gain spectrum according to an amplitude $a_0$ in an LP11 mode of the pump light pulse at the measurement point according to the environmental property measurement method of the embodiment.

In practice, because the probe light has amplitudes of both $b_0$ and $b_1$ at the measurement point, a sum of the spectra in FIGS. 5 and 6 is obtained through measurement. As described above, three spectral peaks $v_{01\text{-}01}$, $v_{01\text{-}11}$, and $v_{11\text{-}11}$ are included, Formula (5) shows a gain profile with a peak at $v_{01\text{-}01}$, Formula (14) shows a gain spectrum with a peak at $v_{11\text{-}11}$, and Formulas (8) and (11) show that gain spectra with a peak at $v_{01\text{-}11}$ overlap on a frequency axis.

It is possible to measure the amount of change in temperature and the amount of change in strain as in NPL 2 by measuring the change in the frequencies of $v_{01\text{-}01}$, $v_{01\text{-}11}$, and $v_{11\text{-}11}$.

However, because the frequency peak difference is as small as several MHz to tens of MHz in this state, the spectral peaks overlap due to an influence of a Brillouin gain spectrum width of tens of MHz when $v_{01\text{-}01}$, $v_{01\text{-}11}$, and $v_{11\text{-}11}$ and are simultaneously generated.

In the measurement method in the environmental property measurement apparatus of the embodiment, a desired Brillouin frequency peak is selected using the secondary probe light for the overlapping of the spectral peaks. The pump light pulse and the probe light are both incident in LP01 for measurement of the desired mode LP01.

Figure 7A:
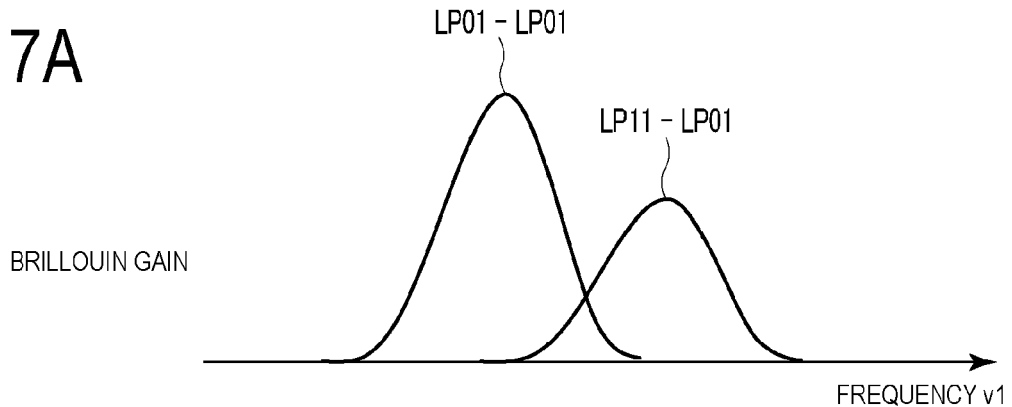
FIGS. 7A to 7C are diagrams illustrating a combination Brillouin gain generated when secondary probe light is used.
Figure 7B:
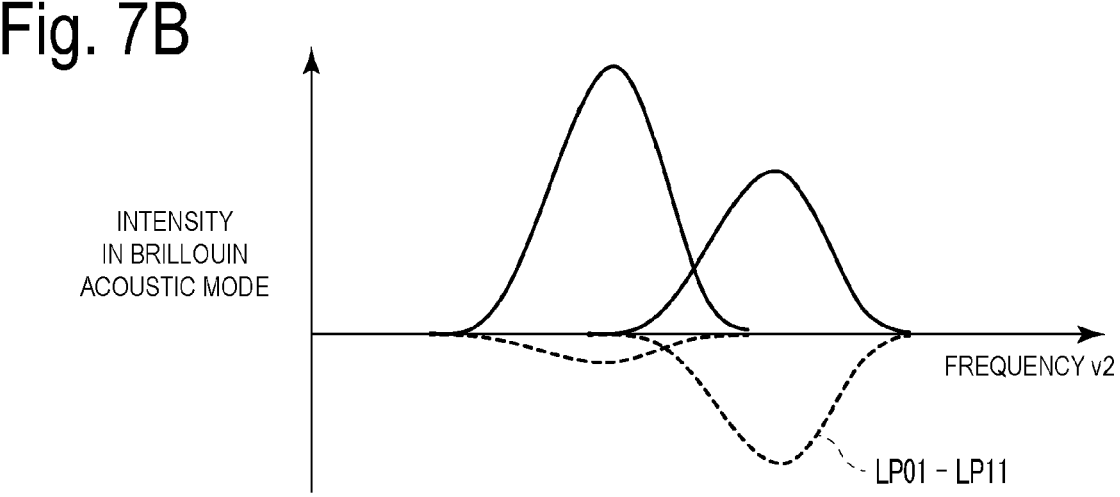
Figure 7C:
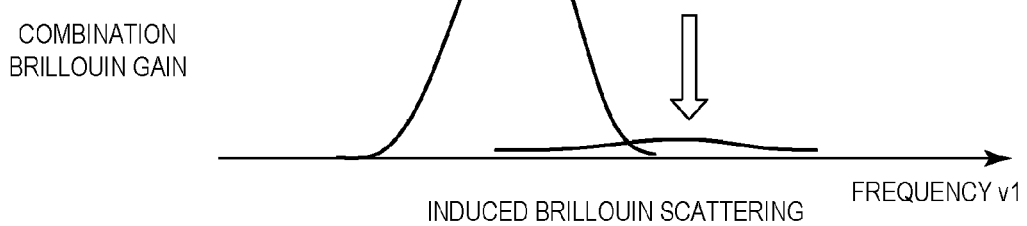

FIGS. 7A to 7C are diagrams illustrating a combination Brillouin gain generated when secondary probe light is used. FIG. 7A illustrates a Brillouin gain according to the pump light pulse and the probe light, FIG. 7B illustrates a relationship between the Brillouin gain in FIG. 7A and a Brillouin gain according to the probe light and the secondary probe light, and FIG. 7C illustrates a combination of two types of Brillouin gains in FIG. 7B. FIG. 7A illustrates Brillouin gain spectra generated in a desired mode ($v_{01\text{-}01}$) and a mode ($v_{01\text{-}11}$) other than the desired mode.

Here, the spectra of $v_{01\text{-}11}$ and $v_{11\text{-}11}$ illustrated in FIG. 6 are generated in the LP11 mode, but only the spectra of $v_{01\text{-}01}$ and $v_{11\text{-}01}$ generated in the LP01 mode are considered for simplicity. For the Brillouin gain in FIG. 7A, the secondary probe light, a secondary probe (indicated by broken lines in FIG. 7B) in LP11 is incident so that a Brillouin gain of $v_{11\text{-}01}$ is reduced. In this case, a frequency difference between the secondary probe light and the probe light is equal to a frequency difference between the pump light pulse and the probe light, and is set on a low light frequency side. Further, it is assumed that a fiber to be measured has weak coupling, that is, an amount of mode conversion is not larger than 1.

In this case, the pump light pulse, the probe light, and the secondary probe light are modes of light in which LP01, LP01, and LP11 are dominant, and the optical intensity is high in the entire optical fiber, as illustrated in FIG. 7B. That is, $v_{01\text{-}01}$ is mainly generated (solid line) in the entire optical fiber, and $v_{11\text{-}01}$ is less than $v_{01\text{-}01}$ in the pump light pulse and the probe light. Subsequently, $v_{01\text{-}11}$ is mainly generated (broken line) in the probe light and the secondary probe light.

Here, a Brillouin gain generated between the pump light pulse and the probe light is generated due to an influence of Brillouin acoustic waves (primary Brillouin acoustic waves) traveling in the same direction as the pump light pulse. On the other hand, because the probe light acts as the pump light pulse, a Brillouin gain generated between the probe light and the secondary probe light is generated due to an influence of the Brillouin acoustic waves (secondary Brillouin acoustic waves) traveling in the same direction as the probe light.

That is, the primary and secondary Brillouin acoustic waves propagate in opposite directions.

In this case, the Brillouin gain $v_{11\text{-}01}$ in a mode other than the desired mode can be curbed by the Brillouin gain $v_{01\text{-}11}$ according to the secondary Brillouin acoustic waves of the probe light and the secondary probe light. This is relevant to $v_{01\text{-}11}$ and $v_{11\text{-}01}$ being generated at the same frequency. That is, because the primary and secondary acoustic waves traveling in a reverse direction and oscillating at the same frequency are curbed by each other (FIG. 7B), the secondary probe light is incident in a mode other than the desired mode, thereby curbing the Brillouin gain of $v_{11\text{-}01}$.

On the other hand, the Brillouin gain $v_{01\text{-}01}$ in the desired mode is at a frequency different from that in $v_{01\text{-}11}$. Therefore, when v01-01 is measured, $v_{01\text{-}01}$ is slightly curbed because the secondary Brillouin acoustic wave of $v_{01\text{-}11}$ is not strongly excited.

As a result, only $v_{01\text{-}01}$ is generated and $v_{11\text{-}01}$ is curbed, as in FIG. 7C.

As described above, in an optical fiber with mode coupling, it is possible to accurately obtain a Brillouin gain spectrum only in a desired mode.

While a target of the embodiment is a mode-multiplexed transmission line having two modes, the target may be an optical fiber having three or more modes, and it is possible to ascertain the Brillouin gain spectrum using the same unit through incidence of secondary probe light set to the same frequency difference as a frequency difference between the pump light pulse and the probe light in a mode other than a desired mode.

REFERENCE SIGNS LIST

F Measurement optical fiber
11 Laser light generation unit
12 Mode selection unit
13 First light frequency control unit
14 Second light frequency control unit
15 First light pulsing unit
17 Mode selection and wave combination unit
18 Optical filter
19 Light reception unit
21 Digitalization processing unit
22 Numerical computation unit
31 Double side band modulation unit
32 First optical filter unit
33 Second optical filter unit
34 Reflective optical filter unit

The invention claimed is:

1. An environmental property measurement apparatus for measuring an environmental property in a length direction using a few mode fiber having a plurality of multiplexed modes as a measurement optical fiber by analyzing a Brillouin frequency shift using a Brillouin optical time domain analysis method, the environmental property measurement apparatus comprising:
a first unit configured to input probe light in a desired mode to one end of the measurement optical fiber;
a second unit configured to input to an other end of the measurement optical fiber, a light pulse in the desired mode as a pump light pulse with respect to the probe light, the light pulse having a frequency difference corresponding to a Brillouin frequency shift of the measurement optical fiber relative to the probe light on a high frequency side; and
a third unit configured to input second probe light having the frequency difference corresponding to the Brillouin frequency shift of the measurement optical fiber relative to the probe light on a low frequency side to the other end of the measurement optical fiber, the second probe light being probe light with respect to the probe light in another mode different from the desired mode.

2. The environmental property measurement apparatus according to claim 1,
wherein the second unit comprises a first light frequency control unit and the third unit comprises second light frequency control unit,
wherein the first light frequency control unit is configured to control a light frequency such that the frequency difference corresponding to the Brillouin frequency shift of the measurement optical fiber relative to the probe light is provided to the light pulse, and
the second light frequency control unit is configured to control the light frequency such that the frequency difference corresponding to the Brillouin frequency shift of the measurement optical fiber relative to the probe light is provided to the second probe light.

3. The environmental property measurement apparatus according to claim 1, further comprising:
a double side band modulation unit,
wherein the second unit comprises a first optical fiber unit, and the third unit comprises a second filtering unit,
wherein the second unit is configured to select a high frequency side of two side bands which the double sided band modulation unit generates with the first optical filter to control a light frequency such that the frequency difference corresponding to the Brillouin frequency shift of the measurement optical fiber relative to the probe light is provided to the light pulse, and
the third unit is configured to select a low frequency side of the two side bands with the second optical filter unit to control the light frequency such that the frequency difference corresponding to the Brillouin frequency shift of the measurement optical fiber relative to the probe light is provided to the second probe light.

4. The environmental property measurement apparatus according to claim 1, further comprising:
a double side band modulation unit and a reflective optical filter unit,
wherein the double side band modulation unit is configured to generate two side bands, and
the reflective optical filter unit is configured to reflect one of the two side bands and transmit the other of the two sides bands, and
the second unit is configured to select a high frequency side of the two side bands reflected or transmitted by the reflective optical filter unit to control a light frequency such that the frequency difference corresponding to the Brillouin frequency shift of the measurement optical fiber relative to the probe light is provided to the light pulse, and
the third unit is further configured to select a low frequency side of the two side bands reflected or transmitted by the reflective optical filter unit to control the light frequency such that the frequency difference corresponding to the Brillouin frequency shift of the measurement optical fiber relative to the probe light is provided to the second probe light.

5. An environmental property measurement method for measuring an environmental property in a length direction using a few mode fiber having a plurality of multiplexed modes as a measurement optical fiber by analyzing a Brillouin frequency shift using a Brillouin optical time domain analysis method, the environmental property measurement method comprising:
- inputting probe light in a desired mode to one end of the measurement optical fiber;
- inputting to an other end of the measurement optical fiber, a light pulse in the desired mode as a pump light pulse with respect to the probe light, the light pulse having a frequency difference corresponding to a Brillouin frequency shift of the measurement optical fiber relative to the probe light on a high frequency side; and
- inputting second probe light having the frequency difference corresponding to the Brillouin frequency shift of the measurement optical fiber relative to the probe light on a low frequency side from the other end of the measurement optical fiber, the second probe light being probe light with respect to the probe light in another mode different from the desired mode.

* * * * *